United States Patent
Würsching et al.

(10) Patent No.: US 7,459,856 B1
(45) Date of Patent: Dec. 2, 2008

(54) COMPACT FLUORESCENT LAMP WITH OUTER ENVELOPE AND METHOD FOR MANUFACTURING

(75) Inventors: István Würsching, Erzsébet tér (HU); József Fülöp, Nápoly u (HU); Ferenc Papp, Ugró Gyula u (HU); László Bánkuti, Erdősor u (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/837,858

(22) Filed: Aug. 13, 2007

(30) Foreign Application Priority Data

May 10, 2007 (HU) .................................... 0700331

(51) Int. Cl.
*H01J 7/44* (2006.01)
(52) U.S. Cl. ............................. 315/56; 313/493; 315/72
(58) Field of Classification Search .................. 315/56, 315/72; 313/491, 493, 634
See application file for complete search history.

(56) References Cited

U.S. PATENT DOCUMENTS 4,527,089 A    7/1985   Bouchard et al.

(Continued)

FOREIGN PATENT DOCUMENTS

EP           0 534 728 A1      3/1993

(Continued)

OTHER PUBLICATIONS

PCT/US2008/060825 International Search Report, mailed Jul. 25, 2008.

*Primary Examiner*—Douglas W. Owens
*Assistant Examiner*—Jimmy T Vu
(74) *Attorney, Agent, or Firm*—Fay Sharpe LLP (57) ABSTRACT

A compact fluorescent lamp comprises a discharge tube arrangement with at least one discharge tube. The tube is formed of glass, encloses a discharge volume filled with a discharge gas and has a fluorescent phosphor coating disposed on the inner surface of the tube. The tube forms a continuous arc path and is provided with electrodes disposed at each end of the arc path. The lamp also comprises a ballast circuit mounted on a printed circuit board, which is oriented in a plane substantially parallel to the principal axis of the lamp. The ballast circuit is connected to the electrodes by lead-in wires and to a supply voltage by lead-out wires and controls the current in the tube. A bulb shaped outer envelope has a substantially spherical portion enclosing at least a part of the tube arrangement and an elongated end portion enclosing at least the ballast circuit. The end portion of the outer envelope having an open end on a base side is closed and terminated by a closing means of a material compatible with the material of the outer envelope. The ballast circuit and the discharge tube arrangement are held within the outer envelope and relative to each other in a predetermined position by a holding and protecting shield being oriented in a plane substantially perpendicular to the principal axis of the lamp and comprising a receiving and fixing portion for the discharge tube and the printed circuit board of the ballast circuit.

A method for manufacturing a compact fluorescent lamp as described above is also disclosed. In the proposed method, the ballast circuit and the discharge tube arrangement are inserted into and attached to a holding and protecting shield.

20 Claims, 6 Drawing Sheets

Fig. 1

U.S. PATENT DOCUMENTS

| | | |
|---|---|---|
| 5,629,581 A | 5/1997 | Belle et al. |
| 5,691,598 A | 11/1997 | Belle et al. |
| 6,064,155 A | 5/2000 | Maya et al. |
| 6,116,754 A | 9/2000 | Ocsovai et al. |
| 6,204,602 B1 * | 3/2001 | Yang et al. .................... 315/58 |
| 6,445,131 B1 * | 9/2002 | Wursching et al. ............ 315/56 |
| 7,256,547 B2 * | 8/2007 | Kubota et al. ................. 315/56 |

FOREIGN PATENT DOCUMENTS

| | | |
|---|---|---|
| EP | 1 081 743 B1 | 4/2004 |
| EP | 1 577 921 A | 9/2005 |
| EP | 1 777 732 A2 | 4/2007 |

\* cited by examiner

COMPACT FLUORESCENT LAMP WITH OUTER ENVELOPE AND METHOD FOR MANUFACTURING

FIELD OF THE INVENTION

This invention relates to compact fluorescent lamps (CFL), and more particularly to compact fluorescent lamps that can replace incandescent lamps of general purpose. Even more specifically the invention relates to low-pressure compact fluorescent lamps that have an outer envelope and a ballast circuit within the outer envelope.

BACKGROUND OF THE INVENTION

The majority of the known and commercially available low-pressure discharge lamps are so-called compact fluorescent lamps at present. These lamps are determined to replace incandescent lamps used in a wide field of industry and home applications. Main advantages of these lamps are low power consumption and a long lifetime. Disadvantageous is however in CFL-s their relatively high price and large length dimension. Many configurations have been proposed to solve the length dimension problem. Such solutions include the multiple tube arrangements and the coiled tube arrangements.

U.S. Pat. No. 4,527,089 discloses a compact fluorescent lamp (CFL) comprising multiple, individual tubes mechanically formed into an assembly and inserted into an outer envelope. The individual open-ended tubes are connected to each other through an arc directing means to form a continuous arc path. The outer envelope has a cylindrical shape, is hermetically sealed and includes an arc generating and sustaining medium such as an atmosphere of mercury and argon. The electric wires of the fluorescent lamp as lead-in wires are lead through a flare that serves as a sealing element of the cylindrical outer envelope. The ballast circuit providing energy for the fluorescent lamp is situated outside the outer envelope and therefore it requires special contact elements and arrangement.

U.S. Pat. No. 5,691,598 describes a fluorescent lamp with thermal heat shield between lamp tube and ballast circuitry. This fluorescent lamp includes the lamp tube and first and second power-transferring means at the ends of the lamp tube for providing the fill materials in the lamp tube with electrical power. A thermal heat shield separating the first power-transferring means from a ballast circuitry is also included, which supplies power to the first power-transferring means and which has a lifetime that becomes substantially less as its operating temperature increases. The thermal heat shield is constructed so that it reflects thermal radiation back to the first power-transferring means and any adjacent portion of the lamp tube to reduce the operating temperature of the ballast circuitry by more than about one degree Celsius compared with the absence of the heat shield. This thermal heat shield however is constructed only for use in a CFL with a ballast circuit comprised in a housing without an outer envelope.

U.S. Pat. No. 6,064,155 discloses a fluorescent lamp with an outer envelope having an external shape of an incandescent lamp on a standard Edison-type base. The discharge tube is wound in a coil around the axis of the envelope and is disposed within the outer envelope. Ballast is also disposed within the outer envelope. A heat shield is disposed between the lamp and the ballast to thermally isolate the lamp from the ballast, whereby heat from the lamp will not adversely affect the ballast. Although this lamp is provided with integrated ballast inside the outer envelope, serious difficulties may arise during production due to the use of the heat shield disposed between the lamp and the ballast. It is not disclosed and therefore it is not clear from this document how the lamp and the ballast circuit is positioned and fixed inside the outer envelope and how the electrical connection between the lamp electrodes and the ballast circuit or between the ballast circuit and the base is established.

There is a need for a compact fluorescent lamp with a bulbous outer envelope and with an integrated ballast inside the outer envelope which is provided with means for holding the ballast circuit and the discharge tube arrangement within the outer envelope and relative to each other in a predetermined position and which at the same time provides for mechanical protection against vibrations. An improved configuration is required that allows the lamp to be manufactured easier and therefore provides a cheaper CFL. There is also need for an improved method of production, which is easy to combine with the conventional manufacturing steps and therefore compatible with mass production. It is sought to provide a compact fluorescent lamp configuration, which readily supports different types of discharge tube configurations.

SUMMARY OF THE INVENTION

In an exemplary embodiment of the present invention, there is provided a compact fluorescent lamp comprising a discharge tube arrangement with at least one discharge tube. The tube is formed of glass, encloses a discharge volume filled with a discharge gas and has a fluorescent phosphor coating disposed on the inner surface of the tube. The tube forms a continuous arc path and is provided with electrodes disposed at each end of the arc path. The lamp also comprises a ballast circuit mounted on a printed circuit board, which is oriented in a plane substantially parallel to the principal axis of the lamp. The ballast circuit is connected to the electrodes by lead-in wires and to a supply voltage by lead-out wires and controls the current in the tube. A bulb shaped outer envelope has a substantially spherical portion enclosing at least a part of the tube arrangement and an elongated end portion enclosing at least the ballast circuit. The end portion of the outer envelope having an open end on a base side is closed and terminated by a closing means of a material compatible with the material of the outer envelope. The ballast circuit and the discharge tube arrangement are held within the outer envelope and relative to each other in a predetermined position by a holding and protecting shield being oriented in a plane substantially perpendicular to the principal axis of the lamp and comprising a receiving and fixing portion for the discharge tube and the printed circuit board of the ballast circuit.

In an exemplary embodiment of another aspect of the present invention, a method for manufacturing a compact fluorescent lamp is proposed. The method comprises the following steps: an outer envelope comprising a substantially spherical portion and an elongated end portion being terminated by an open end on a base side is provided. The open end of the elongated portion of the envelope is closed and terminated with a closing means of a material compatible with the material of the outer envelope. The closing means also comprises a tubular opening for receiving and guiding lead-out wires between the ballast circuit and contact terminals of a base shell. The envelope is separated into two parts by cutting along a circumferential line in a plane substantially perpendicular to the principal axis of the lamp into an upper part and a lower part terminated by the closing means at the base side. A holding and protecting shield is attached to the printed circuit board of the ballast circuit and the discharge tube arrangement is inserted into the holding and protecting shield.

The lead-in wires of the discharge tube arrangement and the lead-out wires are connected to the respective connection points of the ballast circuit, thereby providing a lamp ballast assembly. The lamp ballast assembly is introduced into the lower part of the envelope and the lead-out wires are led through the tubular opening of the closing means. The two separated parts of the envelope are brought into contact with each other along the separating line. The upper and lower part of the envelope are connected and sealed along the separating line. The envelope is provided with a base and the lead-out wires are connected to contact terminals of the base.

The disclosed compact fluorescent lamp provides for a firm and vibration damping mechanical fixing of the CFL components as well as a simplified method of production thereof. By using a holding and protecting shield according to the invention, the ballast circuit and the discharge tube arrangement are held within the outer envelope and relative to each other in a predetermined position. A further advantage accomplished by the invention is an effective protection of the ballast circuit against heat applied during connecting of the two separated parts of the outer envelope. Most of the consecutive manufacturing steps used during the production of a conventional incandescent lamp may be maintained, thereby providing better conditions for mass production. The use of a flare with an exhaust tube provides a possibility to make benefit of the production line used for manufacturing conventional incandescent lamps, which also reduces the cost of production especially when compared with other GLS (General Lighting Service) look alike lamps. Further advantage of this lamp is the full mechanical and electric compatibility with bulb-shaped incandescent lamps that makes it an efficient replacement lamp. The proposed lamps provide a certain level of protection against environmental load due to the outer envelope.

BRIEF DESCRIPTION OF THE DRAWINGS

The invention will now be described in detail with reference to the enclosed drawing, in which.

DETAILED DESCRIPTION OF THE INVENTION

Figure 1:
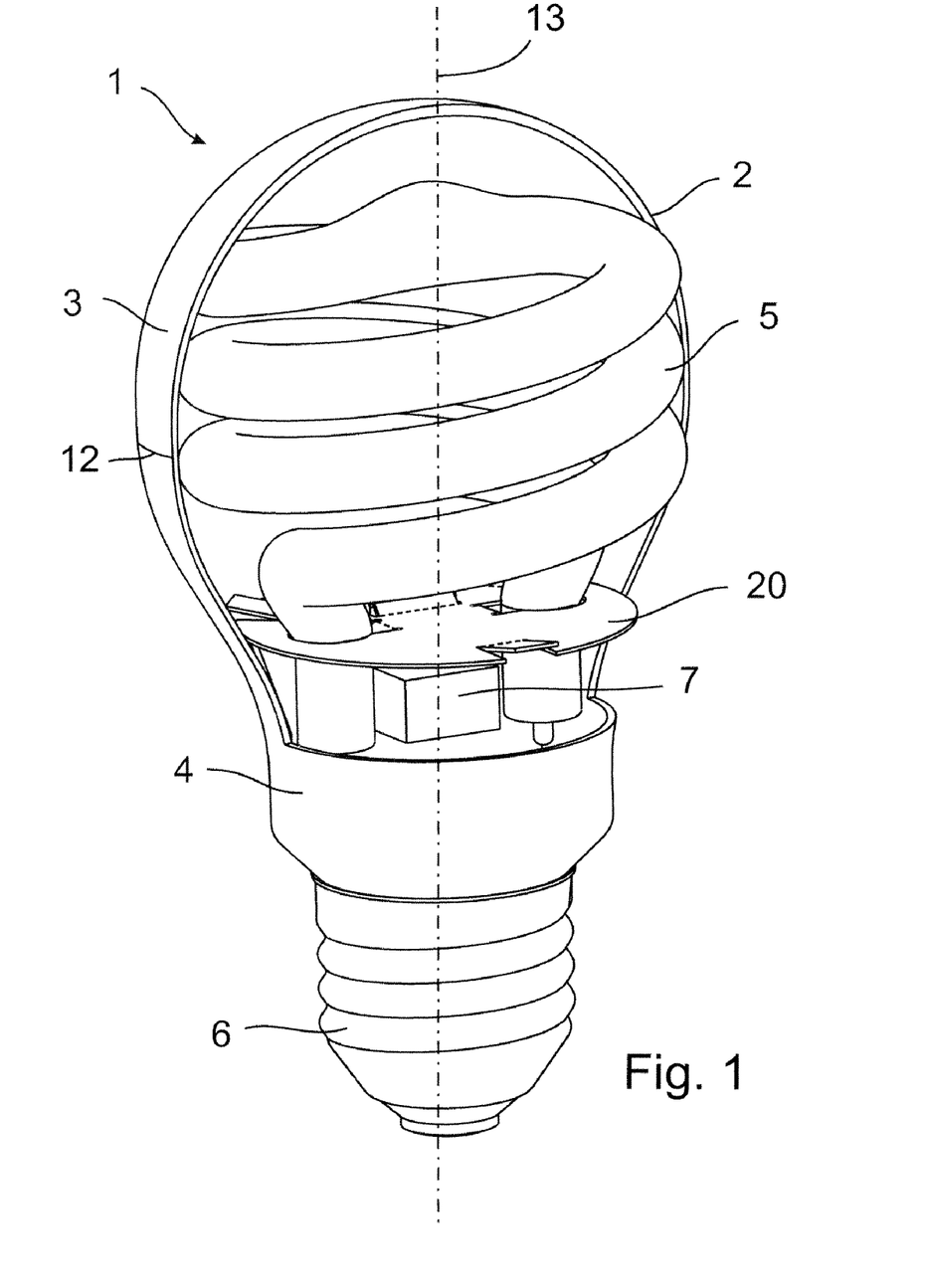
FIG. 1 is a perspective view, partially in cross section, showing an embodiment of the invention.
Figure 2:
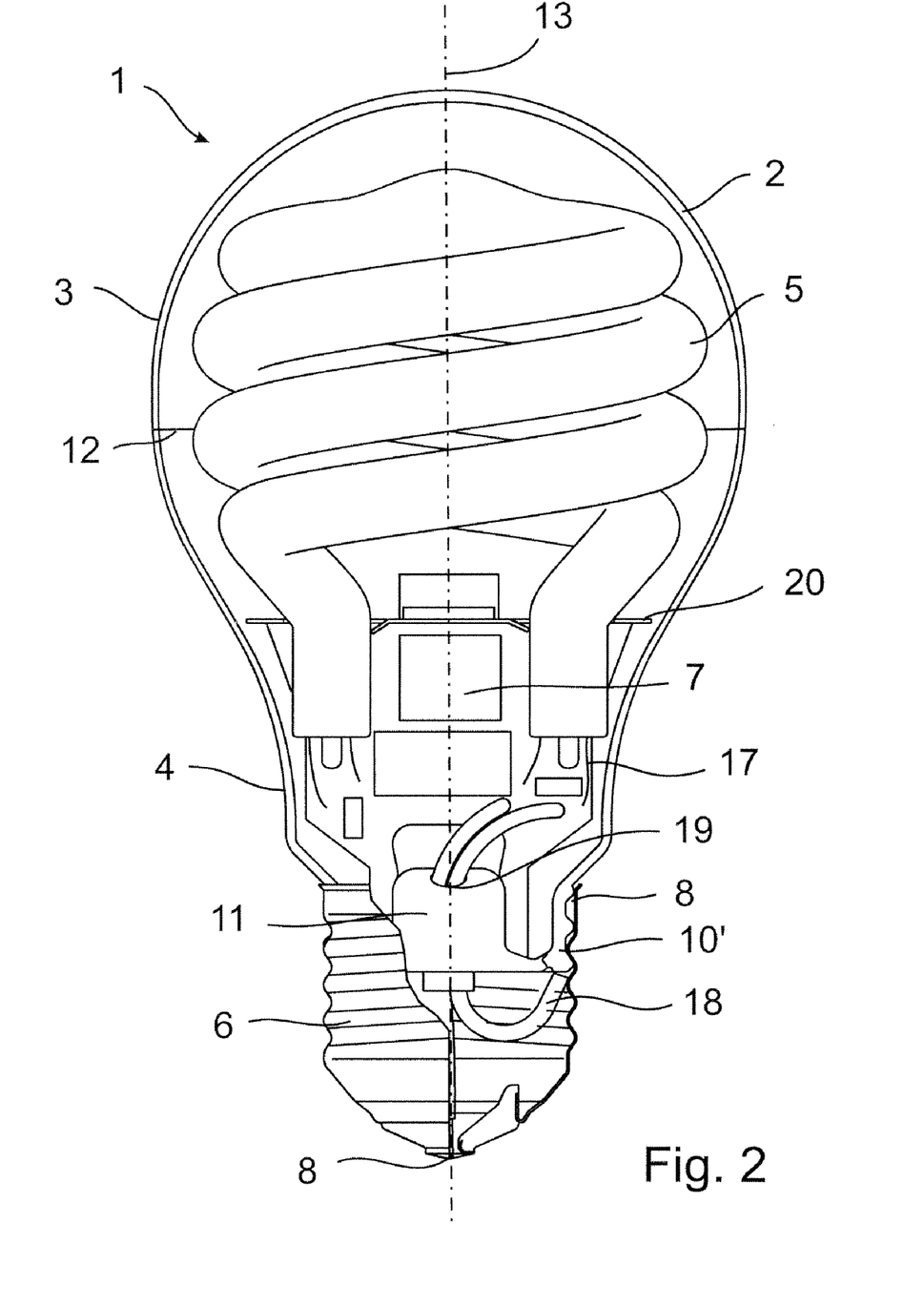
FIG. 2 is a front view, partially in cross section, according to the embodiment of the invention shown in FIG. 1.
Figure 3:
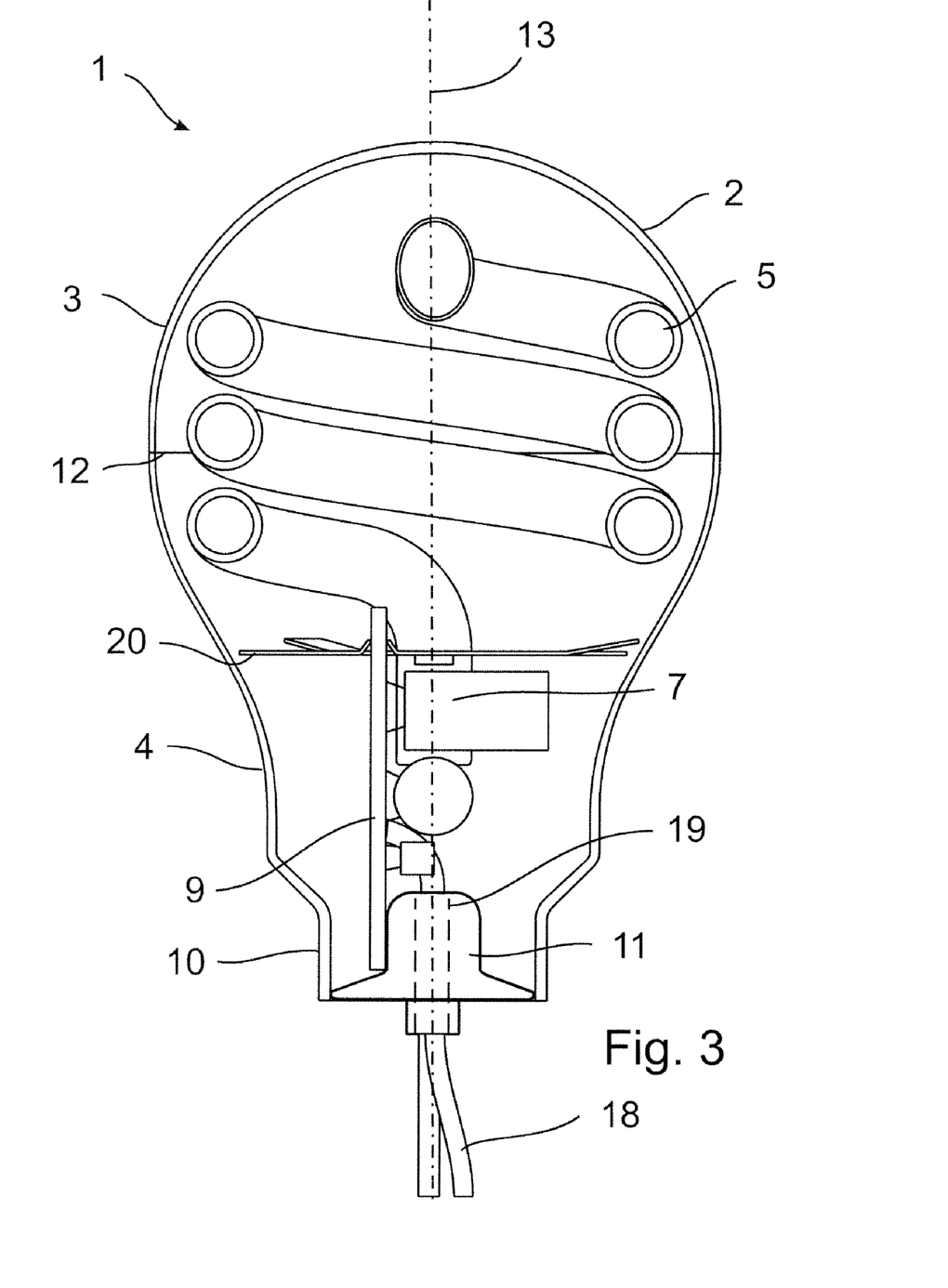
FIG. 3 is a side view, partially in cross section, according to the embodiment of the invention shown in FIG. 1.

Referring first to FIGS. 1 to 3, a low-pressure discharge lamp 1 is shown. The lamp is a fluorescent discharge lamp, with an outer envelope 2 enclosing a discharge tube arrangement 5 and a ballast circuit 7. The outer envelope 2 has a spherical part 3 and a longitudinal part 4 with an open-ended neck portion 10 connected to a base 6 and defines a principal axis 13. FIG. 2 shows a threaded neck portion 10' for connection to a screw type base and FIG. 3 shows a neck portion 10 for connection to a bayonet base. The outer envelope is cut in two parts and separated at a cutting line 12 in order that the ballast circuit 7 and the discharge tube arrangement 5 can be inserted and connected inside the outer envelope 2 as described in detail below. The discharge tube arrangement 5 may comprise a single discharge tube or a plurality of elongated discharge tubes. The discharge tubes are made of glass, enclose a discharge volume filled with a discharge gas, and have a fluorescent phosphor coating disposed on the inner surface of the tubes. The ends of the tubes are sealed in a gas tight manner. The tube forms a continuous arc path at the ends of which electrodes and lead-in wires 17 connected to the electrodes are located. The lead-in wires 17 of the discharge tube arrangement are connected to the ballast circuit 7 for controlling the current in the discharge tubes. The ballast circuit 7 is further connected to a supply voltage through lead-out wires 18 that are connected to contact terminals 8 in the lamp base 6. As shown in FIGS. 2 and 3, the open end of the neck portion 10 of the outer envelope 2 is closed and terminated by a closing means 11 of a material same as or compatible with the material the outer envelope. The closing means 11 is provided with a tubular opening 19. The lead-out wires 18 are isolated from each other and led through the tubular opening 19 to the base 6 for connecting the lamp to the supply voltage through a socket. The lamp base is configured to be adapted to a socket, which may be of any conventional types normally used for lamps. The lamp base may be configured to fit in a screw-type socket or a bayonet socket.

The ballast circuit 7 is mounted on a printed circuit board (PCB) 9, which has an orientation substantially parallel to the principal axis 13 of the lamp. The edge of the printed circuit board 9 carrying the ballast circuit 7 advantageously has a similar boundary form as a longitudinal cross section of the wall of the outer envelope 2 taken in a plane parallel to the principal axis 13 of the lamp 1 but with an offset which is defined by the dimensions of the closing means and the discharge tube as it is best seen in FIG. 3.

The closing means 11 used in the compact fluorescent lamp of the invention comprises a flare which is connected to the open end of the neck portion 10 of the envelope and an exhaust tube forming a tubular opening 19 extending through the flare for receiving and guiding the power supply lead-out wires 18 of the ballast circuit. The lead-out wires 18 are isolated from each other and led through the tubular opening 19 to the base 6 for connecting the lamp to the supply voltage through a socket.

The outer envelope 2 is comprised of two parts separated along a circumferential line 12 in a plane substantially perpendicular to the principal axis 13 of the lamp. The two parts include an upper part for receiving a part of the discharge tube arrangement 5 and a lower part for receiving the remaining part of the discharge tube arrangement 5 and the ballast circuit 7. The two parts of the envelope are connected and sealed to form a uniform bulb shaped envelope 2. The circumferential separation line 12 of the outer envelope 2 may preferably be in a region where the wall of the envelope has a substantially cylindrical form. In the shown embodiments, the separation line 12 is at the widest region of the spherical portion of the outer envelope in order to use a relatively large discharge tube that can fill a maximum of the inner volume of the outer envelope. This helps to preserve the relatively small size of a conventional incandescent lamp and to achieve a relatively high luminous output of a relatively large discharge tube. The widest region of the substantially spherical portion of the outer envelope may comprise a cylindrical section sufficient for forming the separation line 12.

In the shown embodiment, the compact fluorescent lamp comprises a discharge tube arrangement 5 of a single tube with substantially straight end sections and an intermediate portion between the end sections. The end sections are at one end of the tube arrangement and are substantially parallel to each other and the intermediate portion has a coiled configuration wound about the principal axis of the lamp.

Alternatively, the discharge tube arrangement may be comprised of straight tube members with a longitudinal axis substantially parallel to the principal axis of the fluorescent lamp, in which the neighboring tube members are connected to each other in series to form a continuous arc path. Possible arrangements also include configurations with two, four or six individual discharge tube members depending on the required output luminous intensity. The discharge tube arrangement may also comprise two individual, elongated discharge tube members bent to an U-shape of substantially the same length, which are interconnected by a bridge to form a continuous arc path. Possible arrangements include also configurations with one or three individual discharge tubes bent in an U-shape depending on the required output luminous intensity. The U-shaped discharge tube members may comprise substantially parallel straight sections defining the length of the discharge tube arrangement and a curved middle section.

Each discharge tube encloses a discharge volume, which is filled with discharge gas. The discharge tubes are substantially tubular. In the shown embodiment, they are cylindrical, but other suitable cross sections may be selected as well. Typically, the discharge tubes are made of glass but other suitable material cannot be excluded either. It is preferred that the wall thickness of the discharge tubes should be substantially constant, mostly from a manufacturing point of view, and also to ensure an even discharge within the discharge tubes along their full length.

In order to provide visible light, the internal surface of the discharge tubes is covered with a fluorescent phosphor layer. This phosphor layer is within the sealed discharge volume. The composition of such a phosphor layer is known per se. This phosphor layer converts the UV radiation into visible light. The phosphor layer is applied to the inner surface of the discharge tubes before they are sealed.

The discharge tube arrangement 5 and the printed circuit board 9 are held within the outer envelope and relative to each other by a holding and protecting shield 20, which is oriented in a plane substantially perpendicular to the principal axis 13 of the lamp. The holding and protecting shield 20 comprises a receiving and fixing portion for the discharge tube arrangement 5 and the printed circuit board 9 of the ballast circuit 7 and provides sufficient protection against mechanical vibration and shocks.

Figure 4:
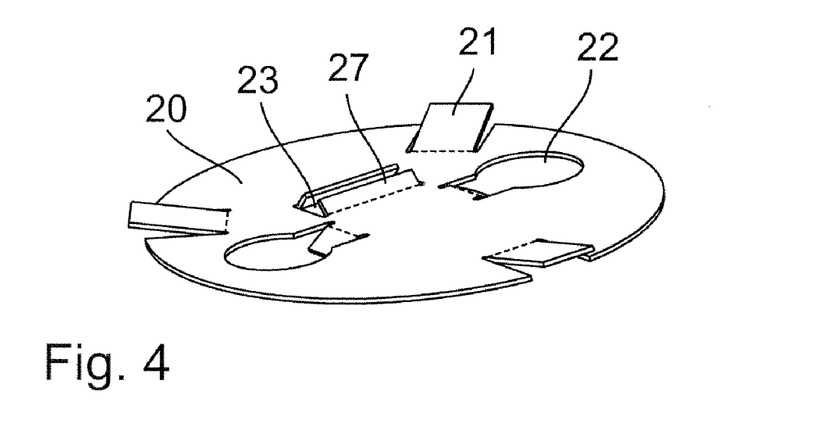
FIG. 4 is a perspective view of a holding and protecting shield used in the lamp according to an exemplary embodiment of the invention.
Figure 5:
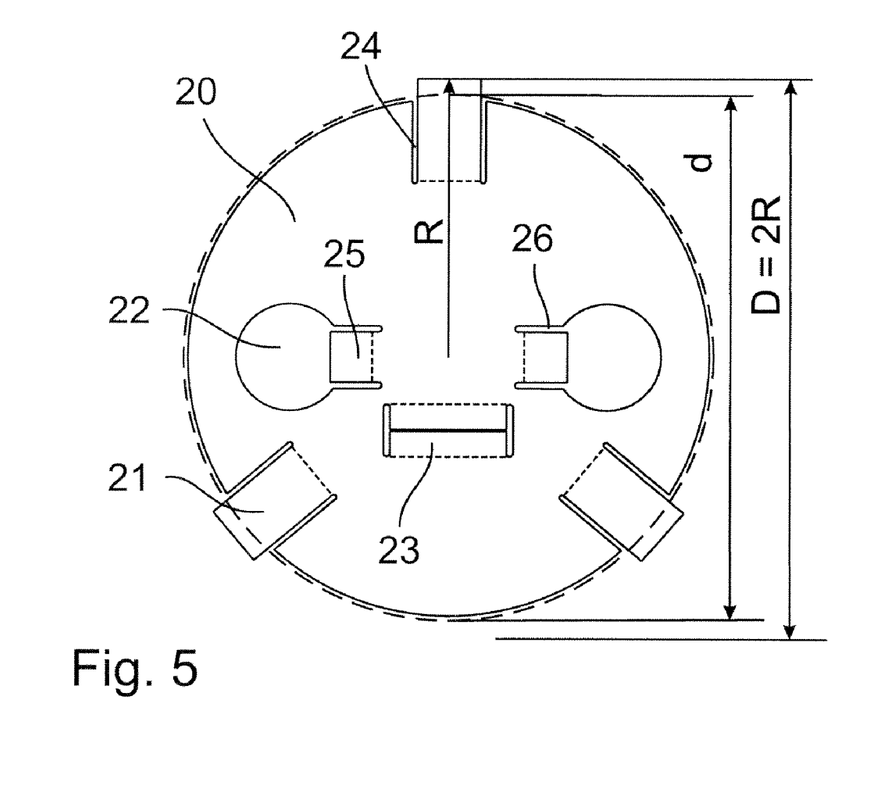
FIG. 5 is a top view of the holding and protecting shield used in the lamp according to an exemplary embodiment of the invention.

As depicted in FIGS. 4 and 5, the holding and protecting shield 20 has a contour form which is substantially the same as the cross sectional contour of the outer envelope 2 in a contact region taken in a plane substantially perpendicular to the principal axis 13 of the lamp in order to mate with the inside wall of the outer envelope 2. Typically, a bulbous envelope has a substantially circular cross sectional boundary, therefore the contour of the holding and protecting shield 20 has also a substantially circular form. The holding and protecting shield is made of a resilient material and has a diagonal dimension (D), which is larger than the inner diameter (d) of the outer envelope in a contact region for providing an axial force when the shield is in an assembling or a final position. In the embodiment shown in FIGS. 4 and 5, the holding and protecting shield 20 has three protrusions 21 extending from the outer edge of the shield for contacting the inner surface (shown with dotted line) of the outer envelope. There is a slit 24 on each side of the protrusions 21 in order to increase resilience thereof, however one slit on one side of the protrusions 21 may be sufficient for ensuring suitable resilience. Of course, the number and the form of the protrusions may vary according to the application. A shield with no protrusions but with slits or at least two protrusions and at least one slit per protrusion may also be used for the purposes of the exemplary embodiments of the present invention. In order to adjust the axial force, the number of protrusions, the number of slits per protrusion and the length of the slits and the length of the protrusions extending beyond the edge of the circular holding and protecting shield may be selected accordingly. When increasing the number of protrusions, or decreasing the number of slits or decreasing the length of the slits, the axial force produced by pressing the edge of the holding and protecting shield against the tapering inside wall of the outer envelope will be increased. On the other side, when decreasing the number of protrusions, or increasing the number of slits or increasing the length of the slits, the axial force produced by pressing the edge of the holding and protecting shield against the tapering inside wall of the outer envelope will be decreased.

The receiving and fixing portion of the holding and protecting shield 20 for receiving and fixing the discharge tube arrangement comprises substantially circular openings 22. The substantially circular openings 22 of the holding and protecting shield 20 have one protrusion 25 extending towards the center of the opening 22 and a slit 26 on each side of the protrusions 25. The diagonal dimension of the substantially circular openings 22 of the holding and protecting shield 20 for receiving and holding the discharge tube ends at the protrusions 25 are smaller than the outer diameter of the discharge tube. The form and the number of the openings can be selected according to the cross sectional form and number of the end sections of the discharge tube arrangement projecting through the holding and protecting shield. Also the number and form of the protrusions may vary according to the application. An opening with no protrusions but with at least two slits distributed equally along the edge of the substantially circular openings or at least two protrusions and at least one slit per protrusion may be used as well for the purposes of exemplary embodiments of the present invention. If the substantially circular opening has no protrusions, the diameter of the openings has to be selected smaller than the outer diameter of the discharge tube in the end region projecting through the shield. The fixing force exerted by the protrusions 25 may be adjusted in a similar way as described above in connection with the axial force of the protrusions 21 of the shield.

The receiving and fixing portion of the holding and protecting shield 20 for receiving and fixing the printed circuit board of the ballast circuit comprises an elongated opening 23 with resilient side members 27 facing each other for allowing insertion of the printed circuit board of the ballast circuit and for fixing it when inserted. The elongated opening 23 is formed in the holding and protecting shield 20 by cutting the material along a straight line to create a longitudinal slit and cutting two small slits in a cross direction at the ends of the longitudinal slit. The length dimensions of the longitudinal slit and the cross slits will determine the size and strength of the resilient side members 27.

The holding and protecting shield may be made of a metal or a plastic material of sufficient strength and flexibility. The outer envelope and the closing means may be made of glass or a plastic material, which is transparent or translucent.

Figure 6:
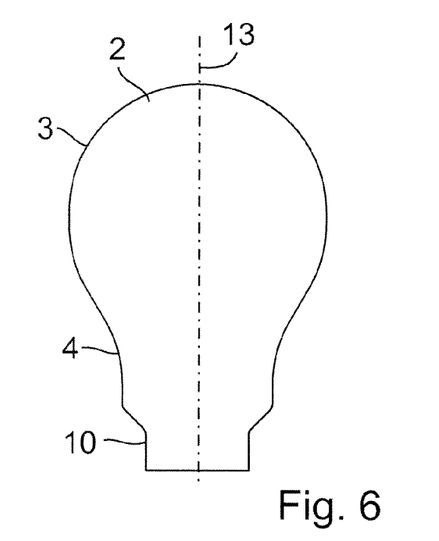
FIG. 6 is a schematic diagram of providing an outer envelope in the manufacturing of the lamp.
Figure 7:
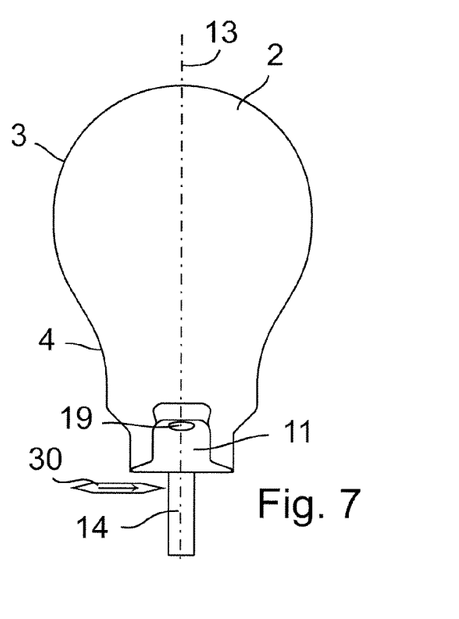
FIG. 7 is a schematic diagram of closing the outer envelope in the manufacturing of the lamp.

Referring now to FIGS. 6 to 12, the steps of producing a compact fluorescent lamp with an outer envelope accommodating a discharge tube arrangement and a ballast circuit, which are held inside the envelope by a holding and protecting shield, will be described in more detail. In step one, as depicted in FIG. 6, an outer envelope 2 with a substantially spherical portion 3 and an elongated end portion 4 is provided. The elongated end portion 4 has an open end at a neck portion 10. In step two, as shown in FIG. 7, the open end of the elongated end portion 4 is closed and terminated by a closing means 11 which is made of a material same as or compatible with the material of the envelope. The closing means 11 also comprises a tubular opening 19 for leading through lead out wires connecting the ballast with the base. The closing means 11 may be comprised of a flare with an exhaust tube 14. After connecting the closing means 11 to the open end of the envelope, the tubular part of the exhaust tube 14 is cut with a cutting dye 30 at a distance close to the flare portion of the closing means 11 so as to provide the tubular opening 19. It is also possible that the length of the exhaust tube 14 is selected to be in the required range during manufacturing and therefore need not be cut shorter. The exhaust tube also provides for a gas communication between the inside volume of the outer envelope and the outside atmosphere, which may be advantageous during operation when different gaseous products may be released within the outer envelope.

Figure 8:
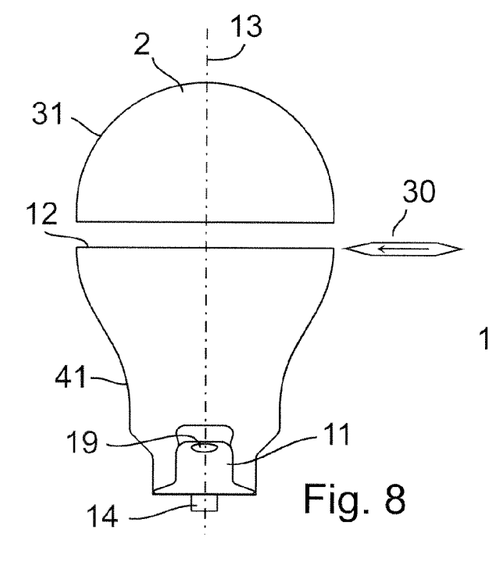
FIG. 8 is a schematic diagram of separating the outer envelope in the manufacturing of the lamp.
Figure 9:
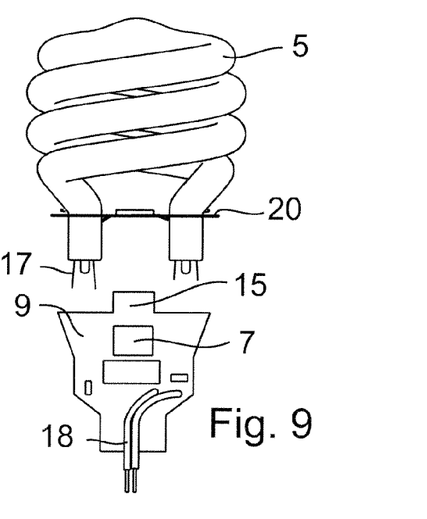
FIG. 9 is a schematic diagram of connecting the discharge tube arrangement with the holding and protecting shield and the ballast circuit in the manufacturing of the lamp.
Figure 10:
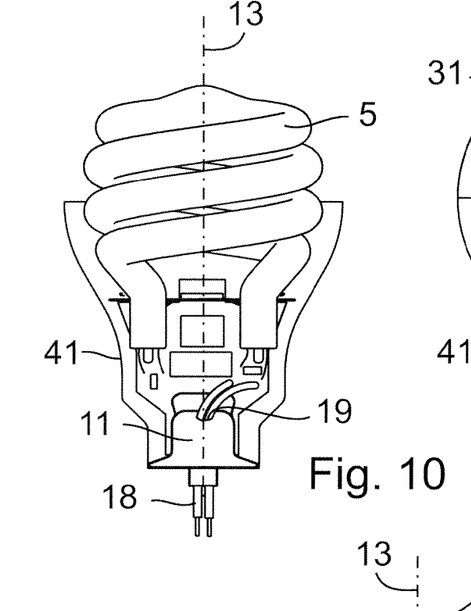
FIG. 10 is a schematic diagram of inserting the lamp ballast assembly in the manufacturing of the lamp.
Figure 11:
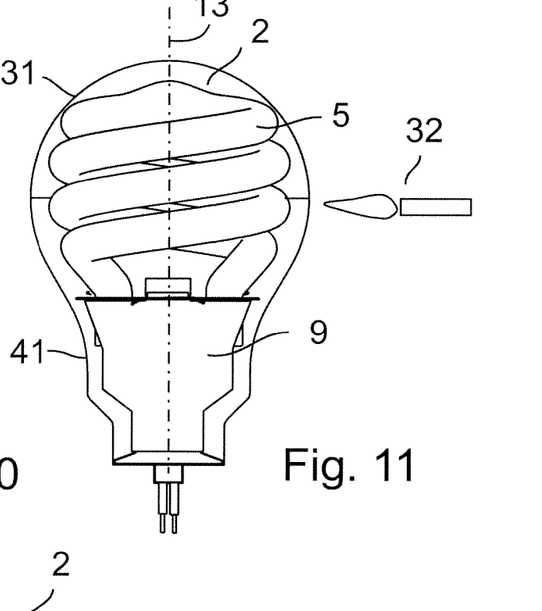
FIG. 11 is a schematic diagram of connecting and sealing the two parts of the envelope in the manufacturing of the lamp.
Figure 12:
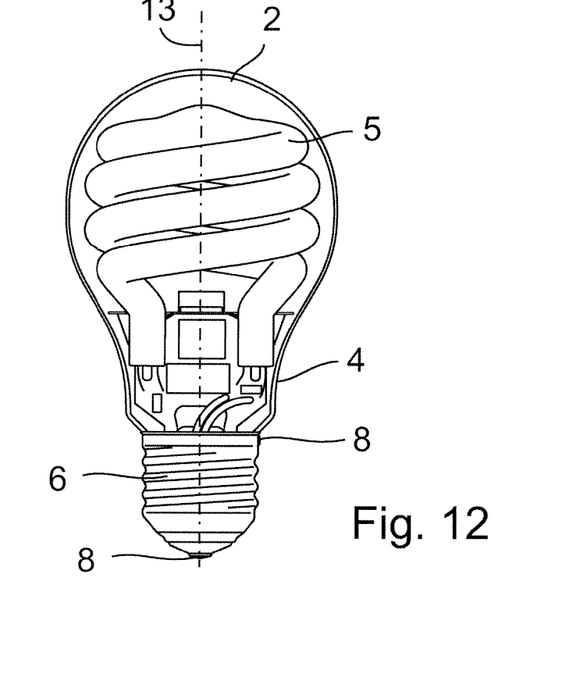
FIG. 12 is a schematic diagram of providing the closed end of the envelope with a base and contact terminals in the manufacturing of the lamp.

In a third step, as shown in FIG. 8, the outer envelope 2 is cut in two parts with a cutting dye 30. This may preferably be done by rotating the envelope around its principal axis while bringing it into a cutting position of the cutting dye, which is also rotating itself. The separation line 12 created in this way has a circumferential or preferably circular form in a plane substantially perpendicular to the principal axis of the lamp. The upper part 31 is removed from the lower part 41, which lower part houses the closing means 11 also comprising the tubular opening 19.

In a fourth step (FIG. 9), the discharge tube arrangement 5 is inserted in a holding and protecting shield 20 and the printed circuit board of the ballast circuit is inserted and attached to the a holding and protecting shield. For this purpose, the printed circuit board 9 has an extension 15 at a wide end opposite to a narrow end fitting into the neck portion 10 of the outer envelope. The sequence of assembling these parts may also be chosen as first attaching the holding and protecting shield to the ballast circuit and then inserting the discharge tube arrangement into the holding and protecting shield. This simple insertion provides the required strengths of fixing of the parts involved relative to each other. Alternatively, other fixing means may also be applied in addition to or instead of the protrusions of the shield. The ballast circuit 7 is connected electrically with the discharge tube arrangement 5 by lead-in wires 17 and to lead-out wires 18 of the power supply, thereby providing a lamp-ballast assembly. One possible way of connecting the lead-in wires and the lead-out wires to the ballast is soldering the insulation free ends of the wires with corresponding connection or terminal points of the ballast circuit. Although this step has been described as a fourth consecutive step following the third step, it may also be performed at any earlier stage of manufacture. It is only important to provide the lamp ballast assembly at the time when the outer envelope has been separated.

In a fifth step (FIG. 10), the lamp-ballast assembly also comprising the holding and protecting shield is inserted into the lower part 41 of the outer envelope 2 until the printed circuit board comes into contact with the inside wall of the outer envelope, which is already closed and terminated by the closing means 11 comprising the tubular opening 19. While inserting the lamp-ballast assembly into the lower part 41 of the outer envelope, the lead-out wires 18 are led through the tubular opening 19 and the holding and protecting shield is pressed against the inside wall of the outer envelope at a tapering region thereby producing an axial force that would lift up the shield. In order to hold against this axial force, the lead-out wires 18 are held and fixed relative to the closing means 11.

In a sixth step (FIG. 11), the upper part 31 of the outer envelope 2 is rejoined and sealed with the lower part 41. In order to accomplish a solid mechanical connection or seal between the upper part 31 and the lower part 41 of the outer envelope 2, the two parts may be welded together using a heater 32, which may be a gas heater or the like. The position of the circumferential separation line of the outer envelope has been selected in the widest region of the spherical portion of the outer envelope where the wall has a substantially cylindrical form at a relatively large distance from the printed circuit board carrying the ballast circuit sufficient to protect the ballast circuit from the heat of the heater 32. The holding and protecting shield between discharge tube and the ballast circuit provides an additional thermal protection. After this step has been accomplished, the lead-out wires 18 may be released upon which the holding and protecting shield moves upwards and presses the discharge tube arrangement against the inside wall of the outer envelope. In this way, the holding and protecting shield provides for a firm and resilient fixing of the discharge tube and the ballast circuit inside the outer envelope and relative to each other and thereby provides also protection against mechanical vibrations and shocks.

Finally, in a seventh step (FIG. 12), the compact fluorescent lamp is completed with a base 6 for connecting the lamp to a conventional or standard socket of any screw-in or bayonet type. In the shown example as it can be seen in FIG. 12, the compact fluorescent lamp is provided with an Edison-type base 6. The lamp base may be fixed to the neck portion of the elongated portion 4 of the outer envelope 2 in any conventional way, for example by an adhesive, cement or a threaded connection. When using a threaded connection (FIG. 2) of the Edison-type base, it may be screwed onto the threaded neck portion 10 of the envelope. The electrical contacts of the lead-out wires of the power supply and the contact terminals 8 of the base 6 are also created in this step.

The invention has been disclosed with reference to the drawing, however it might be apparent to those skilled in the art that it is not limited to the shown and disclosed embodiments, but other elements, improvements and variations are also within the scope of the invention. For example, it is clear that a number of other forms of the envelope, discharge tube and base may be applicable for the purposes of the present invention. For example, the envelope may have a globe shape or T-shape. The number and form of discharge tube members within a lamp may also vary according to size or desired power output of the lamp. The base shell used for providing electrical connection to a power supply may also be selected from any standard or non-standard type.

The invention claimed is:

1. A compact fluorescent lamp comprising
   a discharge tube arrangement said discharge tube arrangement being formed of a least one discharge tube made of glass, enclosing a discharge volume filled with a discharge gas, and having a fluorescent phosphor coating disposed on the inner surface of the tube, the tube forming a continuous arc path and further being provided with electrodes disposed at each end of the arc path;
   a ballast circuit being mounted on a printed circuit board which is oriented in a plane substantially parallel to the principal axis of the lamp for controlling current in the tube and being connected to the electrodes by lead-in wires and to a supply voltage by lead-out wires;
   a bulb-shaped outer envelope comprising a substantially spherical portion enclosing the discharge tube arrangement and an elongated end portion enclosing the ballast circuit;
   the end portion of the outer envelope having an open end on a base side;
   the open end being closed and terminated by a closing means of a material compatible with the material of the outer envelope;
   the ballast circuit and the discharge tube arrangement being held within the outer envelope and relative to each other in a predetermined position by a holding and protecting shield being oriented in a plane substantially perpendicular to the principal axis of the lamp and comprising a receiving and fixing portion for the discharge tube and the printed circuit board of the ballast circuit.

2. The compact fluorescent lamp of claim 1, in which the holding and protecting shield is made of a resilient material and has a diagonal dimension (D) which is larger than the inner diameter (d) of the outer envelope in a contact region for providing an axial force when the shield is in an assembling and a final position.

3. The compact fluorescent lamp of claim 1, in which the holding and protecting shield has a contour form which is substantially the same as the cross sectional contour of the outer envelope in a contact region.

4. The compact fluorescent lamp of claim 1, in which the holding and protecting shield has at least two protrusions extending from the outer edge of the shield for contacting the inner surface of the outer envelope.

5. The compact fluorescent lamp of claim 4, in which the holding and protecting shield has slits on at least one side of the protrusions.

6. The compact fluorescent lamp of claim 1, in which the receiving and fixing portion of the holding and protecting shield comprises substantially circular openings for receiving and holding the discharge tube.

7. The compact fluorescent lamp of claim 6, in which the substantially circular openings of the holding and protecting shield have at least one protrusion extending towards the center of the opening and a slit on at least one side of the protrusion, and the diagonal dimension of the substantially circular openings of the holding and protecting shield for receiving and holding the discharge tube are smaller at the protrusions than the outer diameter of the discharge tube.

8. The compact fluorescent lamp of claim 6, in which the substantially circular openings of the holding and protecting shield have at least two slits distributed equally along the edge of the substantially circular openings and the diameter of the circular openings of the holding and protecting shield for receiving and holding the discharge tube are smaller than the outer diameter of the discharge tube.

9. The compact fluorescent lamp of claim 1, in which the holding and protecting shield comprises an elongated opening as a receiving and holding means for the printed circuit board of the ballast circuit.

10. The compact fluorescent lamp of claim 9, in which the elongated opening of the holding and protecting shield has resilient side members facing each other for allowing insertion of the printed circuit board of the ballast circuit and for fixing the printed circuit board inserted.

11. The compact fluorescent lamp of claim 1, in which the holding and protecting shield is made of a metal.

12. The compact fluorescent lamp of claim 1, in which the holding and protecting shield is made of a plastic material.

13. The compact fluorescent lamp of claim 1, in which the closing means and the outer envelope are made of glass.

14. The compact fluorescent lamp of claim 1, in which the closing means and the outer envelope are made of a plastic material.

15. The compact fluorescent lamp of claim 1, in which the closing means comprises a flare which is connected to the open end of the envelope and an exhaust tube forming a tubular opening extending through the flare for receiving and guiding the lead-out wires of the ballast circuit.

16. The compact fluorescent lamp of claim 1, in which the outer envelope is comprised of two parts separated along a circumferential line in a plane substantially perpendicular to the principal axis of the lamp, the two parts including an upper part for receiving a part of the discharge tube arrangement and a lower part for receiving the remaining part of the discharge tube arrangement and the ballast circuit, the two parts of the envelope being connected and sealed to form a uniform bulb shaped envelope.

17. The compact fluorescent lamp of claim 16, in which the circumferential separation line of the outer envelope is in a region where the wall of the envelope has a substantially cylindrical form.

18. The compact fluorescent lamp of claim 1, in which the discharge tube arrangement is comprised of a single tube with substantially straight end sections and an intermediate portion between the end sections and the end sections being at one end of the tube arrangement and in proximity to each other and the intermediate portion having a coiled configuration wound about the principal axis of the lamp.

19. The compact fluorescent lamp of claim 1, in which the discharge tube arrangement is comprised of straight tube members with a longitudinal axis substantially parallel to the principal axis of the lamp and the neighboring tube members being connected to each other in series to form a continuous arc path.

20. Method for manufacturing a compact fluorescent lamp comprising the steps of:
   a) providing an outer envelope comprising a substantially spherical portion and an elongated end portion being terminated by an open end on a base side;
   b) closing and terminating the open end of the elongated portion of the envelope with a closing means of a material compatible with the material of the outer envelope, the closing means also comprising a tubular opening for receiving and guiding lead-out wires between a ballast circuit and contact terminals of a base shell;
   c) separating the envelope by cutting along a circumferential line in a plane substantially perpendicular to the principal axis of the lamp into an upper part and a lower part terminated by the closing means at the base side;

d) attaching a holding and protecting shield to the ballast circuit and inserting the discharge tube arrangement into the holding and protecting shield;

e) connecting lead-in wires of the discharge tube arrangement and the lead-out wires to the respective connection points of the ballast circuit, thereby providing a lamp ballast assembly;

f) introducing the lamp ballast assembly into the lower part of the envelope and leading the lead-out wires through the tubular opening of the closing means;

g) bringing the separated upper part and lower part of the envelope along the separating line into contact with each other;

h) connecting and sealing the upper and lower part of the envelope along the separating line;

i) providing the envelope with a base; and j) connecting the lead-out wires to contact terminals of the base.

* * * * *